United States Patent
Denham

(10) Patent No.: US 10,704,717 B2
(45) Date of Patent: Jul. 7, 2020

(54) ARTICULATING JOINT AND SYSTEM FOR CONVEYING FLUID FLOW

(71) Applicant: National Oilwell Varco, L.P., Houston, TX (US)

(72) Inventor: Jayson D. Denham, Frisco, TX (US)

(73) Assignee: National Oilwell Varco, L.P., Houston, TX (US)

( * ) Notice: Subject to any disclaimer, the term of this patent is extended or adjusted under 35 U.S.C. 154(b) by 32 days.

(21) Appl. No.: 16/060,505

(22) PCT Filed: Dec. 9, 2016

(86) PCT No.: PCT/US2016/065750
§ 371 (c)(1),
(2) Date: Jun. 8, 2018

(87) PCT Pub. No.: WO2017/100524
PCT Pub. Date: Jun. 15, 2017

(65) Prior Publication Data
US 2019/0003623 A1  Jan. 3, 2019

Related U.S. Application Data

(60) Provisional application No. 62/265,231, filed on Dec. 9, 2015.

(51) Int. Cl.
*F16L 27/06* (2006.01)
*F16L 27/053* (2006.01)

(52) U.S. Cl.
CPC ............ *F16L 27/06* (2013.01); *F16L 27/053* (2013.01)

(58) Field of Classification Search
CPC ....... F16L 27/053; F16L 27/06; F16L 27/073; F16L 27/04
See application file for complete search history.

(56) References Cited

U.S. PATENT DOCUMENTS

| 1,057,939 | A | * | 4/1913 | Cooper | ................... F16L 27/04 |
| | | | | | 285/261 |
| 3,178,207 | A | * | 4/1965 | Fox | ....................... F16L 27/053 |
| | | | | | 285/145.2 |

(Continued)

FOREIGN PATENT DOCUMENTS

| CH | 327422 | A | * | 1/1958 | ............ F16L 27/053 |
| DE | 29913902 | U1 | * | 4/2000 | .............. F16L 27/02 |

(Continued)

OTHER PUBLICATIONS

PCT/US2016/065750 International Search Report and Written Opinion dated Feb. 27, 2017 (16 p.).

*Primary Examiner* — David Bochna
(74) *Attorney, Agent, or Firm* — Conley Rose, P.C.

(57) ABSTRACT

An articulating joint for conveying fluid flow includes first and second conduit members forming a fluid flow path therethrough. An annular member is disposed about the outer surface of the first conduit member and has an outer surface forming a convex partial sphere. A retainer is disposed about the first conduit member and has a seal-retaining ring coupled to the second conduit member. An annular seal is disposed between the seal-retaining ring and the partial sphere to retain fluid in the flow path. A drilling mud return line includes a first such articulating joint, and may include a second articulating joint connected end-to-end to the first articulating joint.

19 Claims, 8 Drawing Sheets

(56) References Cited

U.S. PATENT DOCUMENTS

| | | | |
|---|---|---|---|
| 3,429,588 A * | 2/1969 | Nelson | F16L 27/04 |
| | | | 285/11 |
| 3,454,288 A * | 7/1969 | Mancusi, Jr. | F16L 27/04 |
| | | | 285/98 |
| 3,944,263 A | 3/1976 | Arnold | |
| 4,005,881 A | 2/1977 | Burton et al. | |
| 4,012,060 A * | 3/1977 | Reneau | F16L 27/053 |
| | | | 285/93 |
| 6,158,781 A | 12/2000 | Aaron, III | |
| 8,740,258 B2 | 6/2014 | Wells | |
| 2013/0125989 A1 * | 5/2013 | Clever | B67D 7/3218 |
| | | | 137/1 |

FOREIGN PATENT DOCUMENTS

| | | | |
|---|---|---|---|
| DE | 10016870 A1 * | 11/2000 | F16L 27/04 |
| GB | 308590 A | 2/1930 | |
| GB | 1003540 A * | 9/1965 | F16L 27/053 |
| GB | 1334592 A | 10/1973 | |
| GB | 2021721 A * | 12/1979 | B23Q 1/0027 |
| GB | 2095352 A * | 9/1982 | F16L 27/06 |

\* cited by examiner

ARTICULATING JOINT AND SYSTEM FOR CONVEYING FLUID FLOW

CROSS-REFERENCE TO RELATED APPLICATIONS

This application is a 35 U.S.C. § 371 national stage application of PCT/US2016/065750 filed Dec. 9, 2016, and entitled "Articulating Joint and System for Conveying Fluid Flow," which claims benefit of U.S. provisional patent application Ser. No. 62/265,231 filed Dec. 9, 2015, and entitled "Articulating Joint and System for Conveying Fluid Flow," each being incorporated herein by reference in their entirety for all purposes.

BACKGROUND

Field of the Disclosure

This disclosure relates generally to flexible connections for piping. More particularly, it relates to an articulating joint that allows two portions of a fluid carrying conduit to swivel with respect to one another. Still more particularly, this disclosure relates to an apparatus and system that includes an articulating joint applied in an oilfield mud system.

Background to the Disclosure

Various well drilling systems include a drilling rig that is designed to move and operate among multiple borehole locations while connected to a stationary mud supply system and a stationary mud cleaning system. Piping extending between such a drilling rig and the mud system commonly requires rigid but movable piping, and pipe sections that must be reconfigured to permit movement of the pipe sections. In some systems, moving the drilling rig requires manually altering the length and angle of a mud return line and manually adjusting the angle of the joints, possibly requiring one or more of these members to be temporarily disconnected.

BRIEF SUMMARY OF THE DISCLOSURE

These and other needs in the art are addressed in one embodiment by an articulating joint for conveying fluid flow comprises: a first and second conduit member in fluid communication and forming a fluid flow path therethrough. An annular member is disposed about the outer surface of the first conduit member and includes an outer surface forming a convex partial sphere. A retainer is disposed about the first conduit member and has a seal-retaining ring coupled to the second conduit member. An annular seal is disposed between the seal-retaining ring and the partial sphere and is configured to retain fluid in the flow path.

In some embodiments, the articulating joint includes a connecting flange disposed on the second conduit member at a position adjacent to the first conduit member, and the seal-retaining ring is coupled to a retainer flange. A plurality of fasteners couples the retainer flange to the connecting flange, and a seal is disposed between the retainer flange and the connecting flange. The retainer may include an inner surface that faces toward the first conduit member, and wherein a region of the inner surface of the retainer comprises concave spherical curvature corresponding to the convex partial sphere of the annular member. In some embodiments, the region of the inner surface having concave spherical curvature is positioned adjacent to the second conduit member. The region of the inner surface having concave spherical curvature may include at least a region of the inner surface of the seal-retaining ring, and/or a region of the inner surface of the retainer flange.

In some embodiments, the retaining ring comprises a plurality of circumferentially extending, partial ring segments coupled together by a plurality of fasteners.

In some embodiments, the inner surface of the second conduit portion includes an increased diameter region adjacent to the first conduit member, and the increased diameter region includes a surface that faces the partial sphere and is non-planar when viewed in cross section. The non-planar surface may be convex when viewed in cross section.

In some embodiments, the articulating joint may include a liner disposed within the second conduit member and having a central portion forming a part of the flow path, the liner having an end portion adjacent to the first conduit member and the end portion having an end surface region that is convex when viewed in cross section.

In some embodiments, the articulating joint may include a fin extending in an axial direction along the outer surface of the first conduit member, and having a portion configured to engage the retainer upon the angle between the first and second conduit members being between 0 and 44 degrees.

Also disclosed is an articulating joint for conveying fluid flow, comprising: a first conduit member having an outer surface comprising a partial sphere; a second conduit member pivotably coupled to the first conduit member; a fluid flow path through the first and second conduit members; an annular seal-retaining member disposed about the partial sphere and comprising an inner surface, wherein at least a region of the inner surface faces the partial sphere and comprises spherical curvature. An annular seal is disposed between the seal-retaining member and the partial sphere, the seal being configured to retain fluid in the flow path. The first and second conduit members are configured such that the partial sphere is permitted to move relative to the seal-retaining member and the second conduit member. The seal-retaining member may be fixed relative to the second conduit member such that relative movement between the second conduit member and the seal-retaining member is prevented.

In some embodiments, the articulating joint includes an annular liner disposed within the second conduit member. The liner includes a passageway therethrough that forms a region of the fluid flow path, wherein the cross sectional area of the passageway varies. In some embodiments, the liner includes a surface that is convex, when viewed in cross section, and is positioned adjacent the first conduit member.

Also disclosed is a drilling mud return line having a first articulating joint that includes: a first conduit member having an inner surface and an outer surface, wherein the outer surface includes a convex region; a second conduit member having a longitudinal axis, an inner surface, and an outer surface, the second conduit member being in fluid communication with the first conduit member. The joint further includes: a fluid flow path extending through the first and second conduit members and an annular retainer disposed about the first conduit member and coupled to the second conduit member. The retainer has an inner surface that includes: a first annular region having a positive slope as measured along to the longitudinal axis; a second annular region having a negative slope as measured along the longitudinal axis; and a seal-retaining groove extending between the first and second inner surface regions. An annular seal is disposed within the seal-retaining groove and disposed radially between the retainer and the convex region and configured to retain fluid in the flow path; wherein the retainer configures the first conduit member to pivot with respect to the second conduit member.

In some embodiments, the inner surface region of the retainer comprises a concave curvature, facing toward and matching the curvature of the convex region. In some embodiments, the convex region forms a partial sphere, and the concave curvature of the retainer inner surface is spherical and is concentric with the partial sphere. The concave spherical curvature of the retainer inner surface is formed by the first and second inner surface regions and achieves a maximum distance from the axis at a location between the first and second inner surface regions and along the seal-retaining groove.

In some embodiments of the drilling mud return line, the inner surface of the second conduit member includes a convex end region engaging the convex region of the first conduit member; wherein the retainer is disposed adjacent the convex end region and fixed relative to the second conduit member, forming a base assembly.

In some embodiments of the drilling mud return line, the first articulating joint further includes a first and a second fin extending axially along the outer surface of the first conduit member, each fin having a fin end. The first fin is circumferentially spaced from the second fin and comprises a first portion adjacent the convex region, the first portion configured to engage the base assembly to limit the pivoting of the first conduit member to an angle alpha with respect to the second conduit member within a first plane. The second fin comprises a second portion adjacent the convex region configured, the first portion configured to engage the base assembly to limit the pivoting of the first conduit member to an angle beta with respect to the second conduit member within a second plane disposed at angle from the from the first plane.

In some embodiments, the drilling mud return line includes a second articulating joint connected end-to-end to the first articulating joint.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments, reference will now be made to the accompanying drawings.

NOTATION AND NOMENCLATURE

Figure 1:
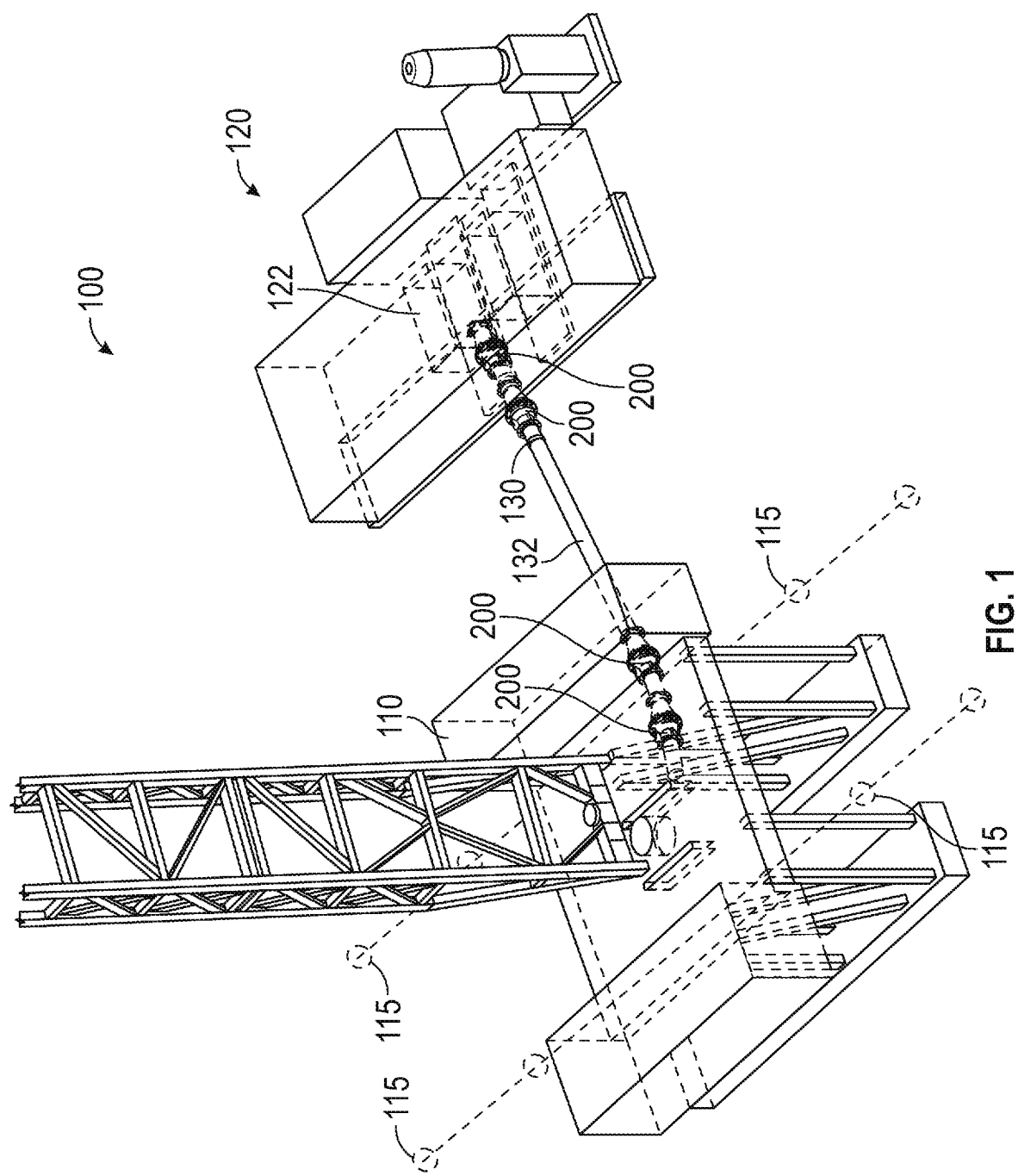
FIG. 1 shows a perspective front view of an embodiment of a well drilling system having multiple articulating joints in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components that are identified elsewhere. In addition, within the specification and the drawings, like or identical reference numerals may be used to identify common or similar elements.

As used herein, including in the claims, the following definitions will apply:

The terms "including" and "comprising," as well as derivations of these, are used in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, X may be based on Y and any number of other factors. The word "or" is used in an inclusive manner. For example, "A or B" means any of the following: "A" alone, "B" alone, or both "A" and "B."

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Furthermore, any reference to a relative direction or relative position is made for purpose of clarity, with examples including "top," "bottom," "up," "upward," "left," "leftward," "down," "lower," "clockwise," and the like. For example, a relative direction or a relative position of an object or feature may pertain to the orientation as shown in a figure or as described. If the object or feature were viewed from another orientation or were positioned differently, it may be appropriate to describe the direction or position using an alternate term.

DETAILED DESCRIPTION OF THE DISCLOSED EXEMPLARY EMBODIMENTS

The present disclosure presents various embodiments of a flowline articulating joint for interconnecting two pipes or other tubular members or for connecting one tubular and one tank, as examples. The articulating joint allows the two pipes to be rotated, pivoted, or swiveled relative to each other while maintaining a path for fluid flow. In some instances while using various embodiments, a fluid may flow through the two pipes and the articulating joint during movement of the joint. Some embodiments of the articulating joint disclosed herein include a fluid flow path designed to reduce or to minimize pressure loss or changes in fluid velocity that might otherwise adversely influence the fluid flow. As such, these embodiments may reduce the power requirements for an accompanying pumping system as compared to existing joints that allow movement or static joints. These embodiments may reduce the potential for entrained solids to be dropped-out or to be plated on the inner surface, i.e. the fluid flow path, as compared to existing joints.

Referring to FIG. 1, in an exemplary embodiment, a well drilling system 100 includes a drilling rig 110 designed to operate among multiple borehole locations 115 spaced-apart in two dimensions, a mud supply system (not shown), a stationary mud cleaning system 120 having a filtering apparatus 122 fluidically coupled to (i.e. in fluid communication with) rig 110 by an articulating mud return line 130. Drilling mud line 130 allows rig 110 to move between the various borehole locations 115 without the need to disconnect or manually alter the length and angle of return line 130. Mud return line 130 includes telescoping conduit 132 and one or more articulating joints 200 configured for fluid flow, as disclosed herein, at each end of telescoping conduit 132. As shown in the exemplary embodiment of FIG. 1, mud return line 130 includes a pair of closely-attached articulating joints 200 at each end of telescoping conduit 132. As will be described in more detail later, each articulating joint 200 may be configured to inhibit rotation or pivoting depending on the needed of a specific application or installation. In some embodiments, articulating joint 200 may be configured to inhibit rotation or pivoting in one plane more than it inhibits pivoting in another plane, e.g. a perpendicular plane. For example, among a pair of closely-attached articulating joints 200 joined end-to-end, a first articulating joint 200 may be configured to inhibit rotation in a vertical plane more than in a horizontal plane, and a second articulating joint 200 may be configured to inhibit rotation in a horizontal plane more than in a vertical plane. As a possible benefit, mud return line 130 may maintain a more flexible configuration, possibly avoiding positions and orientations that might cause it to "bind."

Figure 2:
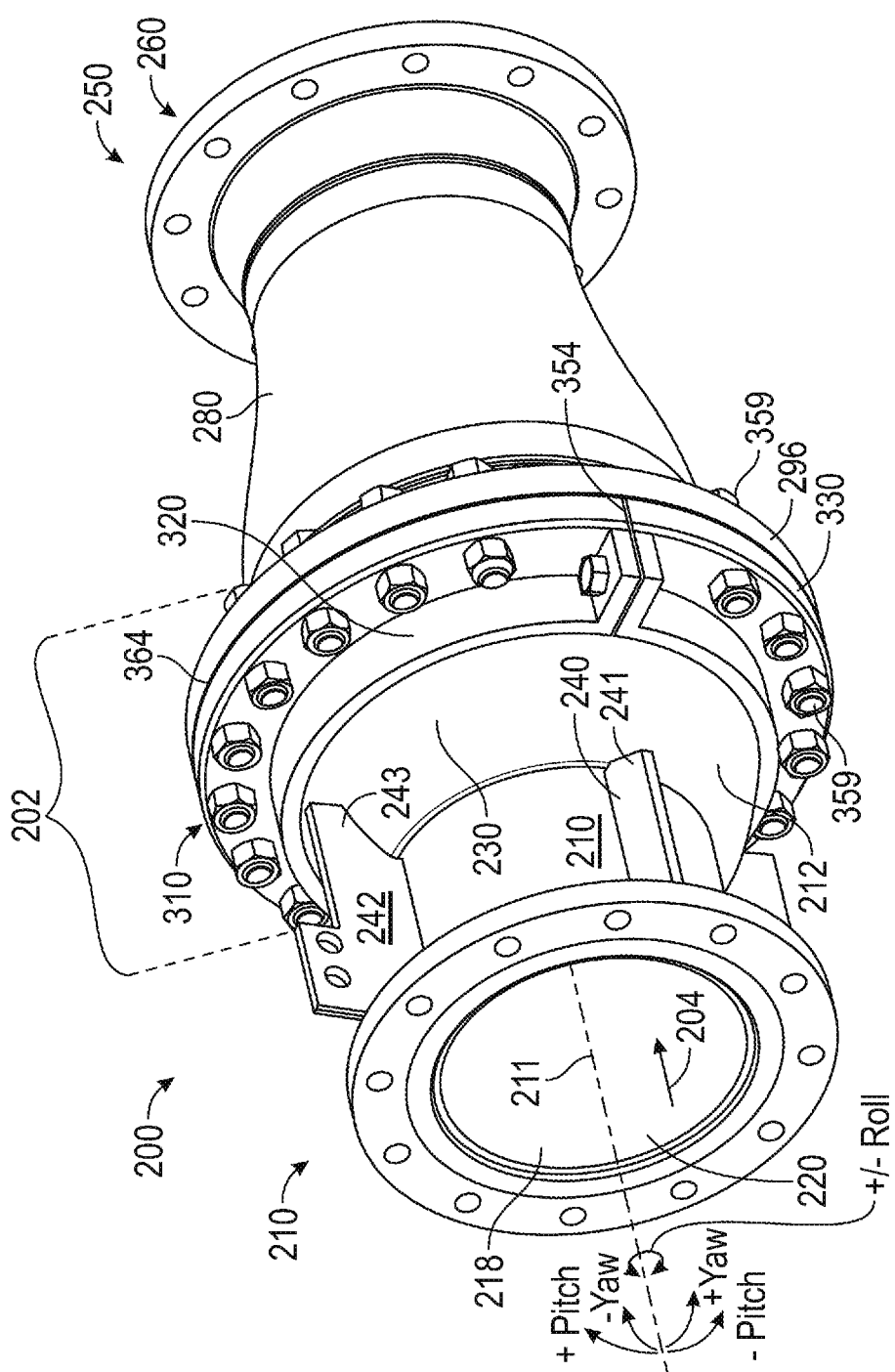
FIG. 2 shows a perspective view of one of the articulating joints of FIG. 1 in accordance with principles described herein.

Referring to FIG. 2, flowline articulating joint 200 includes a ball-in-socket connection 202 and a fluid flow path 204 formed through a first conduit member 210 and a base assembly 250, which includes a second conduit member 260. Second conduit member 260 is pivotably coupled to the first conduit member 210 by ball-in-socket connection 202. Articulating joint 200 is configured to articulate by the swiveling and pivoting capability of ball-in-socket connection 202 and may also be called a swivel joint. Whether in system 100 or in another application, articulating joint 200 may be joined end-to-end with other joints 200 or may be used as a single swivel joint.

Figure 3:
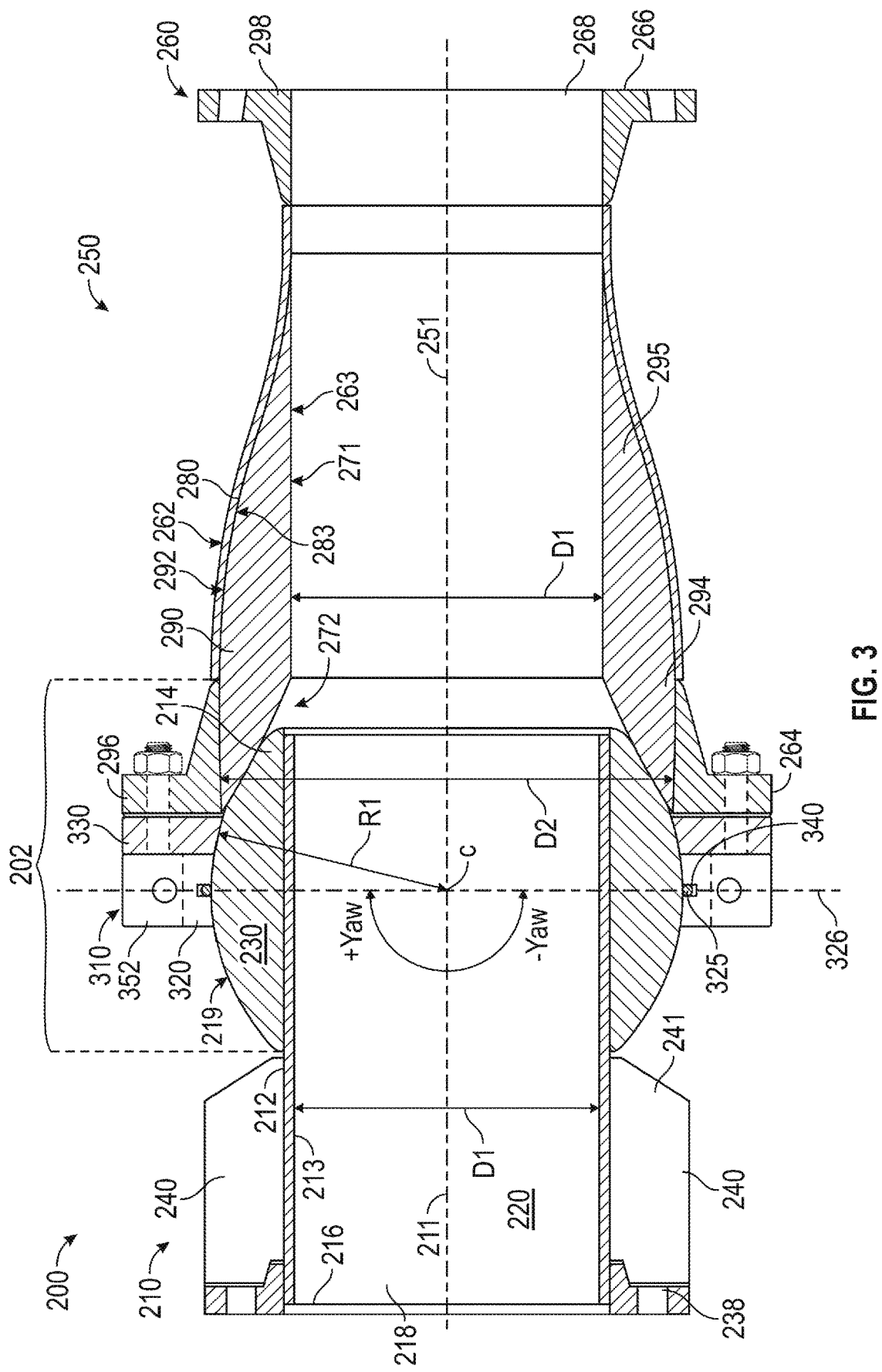
FIG. 3 shows a cross-sectional top view the articulating joint of FIG. 2.

Referring now to FIG. 2 and FIG. 3, first conduit member 210 includes longitudinal axis 211, an outer surface 212, an inner surface 213, a proximal end 214, a distal end 216 axially spaced from proximal end 214, and a fluid passageway 218 formed by inner surface 213 and extending between the ends 214, 216. As embodied, first conduit member 210 is formed from a tubular section 220 centered on axis 211 and extending between the ends 214, 216 and is formed from an annular member, which is a partial sphere 230, coupled around a portion of the tubular section 220 at proximal end 214. First conduit member 210 further includes an annular flange 238 located at distal end 216, and multiple axially aligned fins 240, 242 circumferentially spaced-apart on the outer surface 212 and extending from flange 238.

On the first conduit member 210, proximal end 214 refers to the end that is closest to the ball-in-socket connection 202, and distal end 216 refers to the end that is furthest from the ball-in-socket connection 202. Proximal end 214 participates in forming the ball-in-socket connection 202. At proximal end 214, the outer surface 212 includes a convex, spherical surface region 219 formed by partial sphere 230, having a radius R1. The center of partial sphere 230 and region 219 is annotated by the center point C on axis 211. The inner surface of tubular section 220 forms, at least in part, the inner surface 213 and the corresponding fluid passageway 218. Tubular section 220 and, thus, first conduit member 210 have an inner diameter D1. In some embodiments, partial sphere 230 is made of a polymer with its inner surface molded directly on the outer surface of tubular section 220. In some embodiments, partial sphere 230 is made of steel. In some embodiments, the outer, convex surface region 219 has a surface finish or smoothness within the range of 16-32 RMS. In other embodiments, surface region 219 may have a surface finish that is rougher or smother than the stated range. A hard facing may be added to the surface region 219 of partial sphere 230.

FIG. 2 represent an embodiment having a pair of shorter fins 240, spaced 180° apart and a pair of longer fins 242 spaced 180° apart from each other and spaced 90° from the shorter fins. The shorter fins 240 each have a fin end 241 located adjacent the proximal, i.e. closest, end of partial sphere 230. The longer fins 242 each have an elongated fin end 243 that extends axially into or across a portion of partial sphere 230 and convex surface region 219. Extended end 243 is taller than the adjacent portion of partial sphere 230, extending radially beyond it. With first conduit member 210 aligned with second conduit member 260, as shown in the example of FIG. 2, shorter fins 240 are aligned on a horizontal plane, and longer fins 242 are aligned on a vertical plane. Based on this exemplary arrangement and orientation, shorter fins 240 restrict the pivoting of conduit member 210 in the horizontal plane, which may be called yaw, being limited when a fin end 241 contacts ring 320. Likewise, the vertically extending, longer fins 242 of the articulating joint 200 shown in FIG. 2 and FIG. 4 restrict the pivoting of conduit member 210 in the vertical plane, which may be called pitch, being limited when a fin end 243 contacts ring 320. The second conduit member 260 may also roll about axis 211 relative to first conduit member 210. Rolling of conduit member 260 may, of course, move shorter fins 240 and longer fins 242 to planes other than the horizontal and vertical planes, causing these fins 240, 242 to each influence a combination of pitch and roll. Thus, articulating joint 200 includes three degrees of freedom for the movement of second conduit member 260 relative to first conduit member 210: pitch, yaw, and roll.

In the exemplary embodiment of FIG. 3 with axis 211 aligned with axis 251, the yaw of conduit member 210 with respect to conduit member 260 can range from zero degrees to an angle less than 90 degrees, for example, an angle of 44 degrees, when the fin end 241 engages, i.e. presses against, ring 320.

Because fins 242 are longer than fins 240, pitch movement in the vertical plane is more greatly restricted by fins 242 than yaw movement in the horizontal plane is restricted by fins 240. In the exemplary embodiment of FIG. 4, the pitch of conduit member 210 with respect to conduit member 260 is shown by angle α (alpha). Depending on the embodiment, angle α can be zero degrees, 15 degrees, 44 degrees, or any desired angle less than 90 degrees permitted by longer fins 242. In the embodiment shown in FIG. 4, when the relative pitch of conduit members 210, 260 reaches about 15°, the longer fin end 243 engages ring 320.

Articulating joint 200 is capable of combined pitch and yaw movement. As explained with reference to FIG. 1, some systems employ a pair of closely-attached articulating joints 200 to govern the movement of a connected tubular member. In FIG. 1, a first articulating joint 200 is arranged to limit pitch more than yaw by vertical placement of the longer fins 242 (as in FIG. 2), and a second articulating joint 200 is arranged to limit yaw more than pitch by horizontal placement of the longer fins 242 (rotated 90 degrees about axis 211 as compared to FIG. 2). Various embodiments, combinations of articulating joints 200 may be oriented to have fewer or different limits to rotational movement or the limits to movement rotational may not be aligned with the horizontal plane or may not be aligned with the vertical plane.

Referring again to FIG. 2 and FIG. 3, base assembly 250 includes a longitudinal axis 251, the second conduit member 260 centered on base assembly axis 251, and a retainer 310 coupled at an end of member 260 and centered on axis 251. Member 260 includes an outer surface 262, an inner surface 263, a proximal end 264, a distal end 266 axially spaced from proximal end 264, and a fluid passageway 268 formed by the inner surface 263 and extending between the ends 264, 266. In this exemplary embodiment, second conduit member 260 includes an annular flange 296 at proximal end 264, an annular flange 298 at distal end 266, a structural member 280 centered on axis 261 and extending between flanges 296, 298, and a liner 290 located within flange 296 and structural member 280 and centered on axis 251. Liner 290 extends from proximal end 264 towards distal end 266 without reaching the end flange 298, in this example.

Proximal end 264 refers to the end of second conduit member 260 closest to the ball-in-socket connection 202, and distal end 266 refers to the end of second conduit member 260 furthest from the ball-in-socket connection 202. Proximal end 264 and the retainer 310 participate in forming the ball-in-socket connection 202.

The inner surface 263 of second conduit member 260 includes a first region 271 distal the ball-in-socket connection 202 and an end surface region 272 that is convex and participates in forming the fluid passageway 268 leading from the ball-in-socket connection 202 to end 266. Due to its curvature and placement, the end surface region 272 faces along axis 251 and faces toward axis 251. Accounting for a majority of the inner surface 263, the first region 271 extends axially from distal end 266 towards proximal end 264 and has a diameter equivalent to the inner diameter D1 of the first conduit member 210. The end surface region 272 extends tangentially from first region 271, sharing the diameter of D1, and expands to a larger diameter D2 at proximal end 264. In some embodiments, the curvature of surface region 272 may not be tangent at its intersection with first region 271.

The structural member 280 changes in diameter along its length and may be called a pipe reducer. Its inner surface 283 smoothly transitions from a diameter of D2 adjacent end 264 to a diameter of D1 adjacent end 266. Flange 296 also has an inner diameter of D2, and flange 298 has an inner diameter of D1.

Liner 290 includes an outer surface 292 that matches the shape and size of the inner surface of flange 296 and the inner surface 283 of structural member 280. Liner 290 further includes an end portion 294 on which the convex surface region 272 is formed and includes a central portion 295 extending from end portion 294 and forming part of inner surface first region 271. Thus, the inner surface of liner 290 forms a majority of the inner surface 263 of second conduit member 260. Liner 290 may be fabricated as a separate member comprising rubber, polymer, or steel, as examples, and may be slid or press-fit into the remainder of second conduit member 260. A region or all of inner surface 263 may be formed using a hard surface layer coating, such as a tungsten carbide coating, for example. In some embodiments, liner 290 may be bonded directly to the inner surface of structural member 280 or flange 296. In the assembly of articulating joint 200, the convex, surface region 272 of liner 290 slidingly or rotationally engages the partial sphere 230. Liner 290 minimizes fluid flow "dead space" that would otherwise be present for various angular positions of first conduit member 210 relative to second conduit member 260, potentially reducing eddy currents and the resulting pressure loss during fluid flow and reducing the potential for solids suspended in a fluid to plate or build on the inner surfaces of articulating joint 200. This intended benefit of liner 290 may be particularly pronounced when members 210, 260 are oriented with an angle between 10° and 44° (degrees) with respect to each other, for example.

Figure 5:
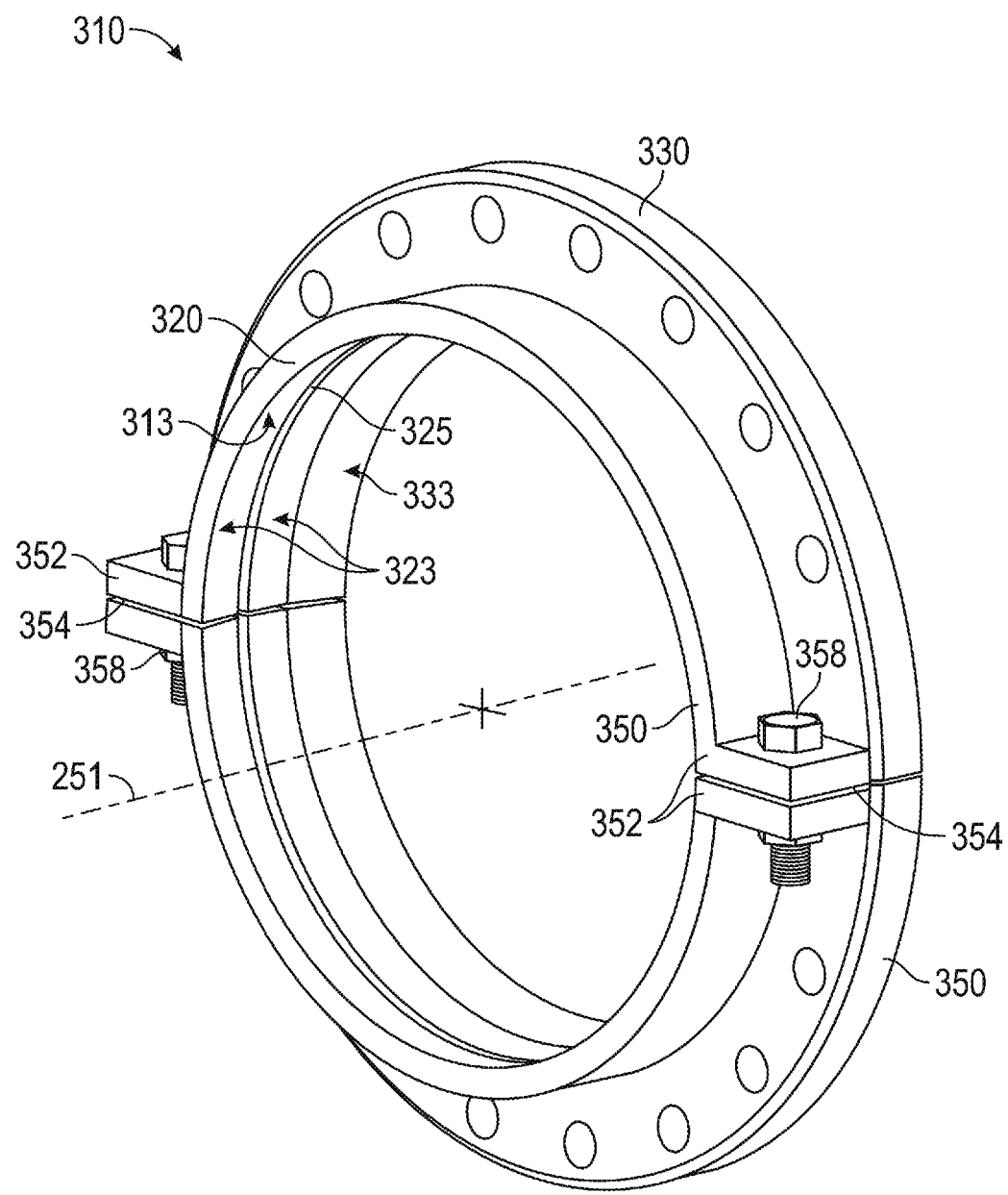
FIG. 5 shows a perspective view of the retainer from the articulating joint of FIG. 2.

Referring to FIG. 5, the retainer 310 includes a concave inner surface 313, a seal-retaining ring 320 having a seal-retaining groove 325 formed within inner surface 313, a retainer flange 330 coupled adjacent seal-retaining ring 320, and an annular seal 340 disposed within the seal-retaining groove 325. Concave inner surface 313 is a spherical region with a curvature that matches the convex curvature of the surface region 219 on the outside of partial sphere 230. In the assembly of joint 200, inner surface 313 covers a portion of surface region 219. In some embodiments, surface 313 has a surface finish or smoothness within the range of 16-32 RMS. Some other embodiments of surface 313 may have a surface finish that is rougher or smother than the stated range. Concave inner surface 313 includes two spherical regions: a ring inner surface 323 of seal-retaining ring 320 and a flange inner surface 333 of retainer flange 330.

Figures 6, 7:
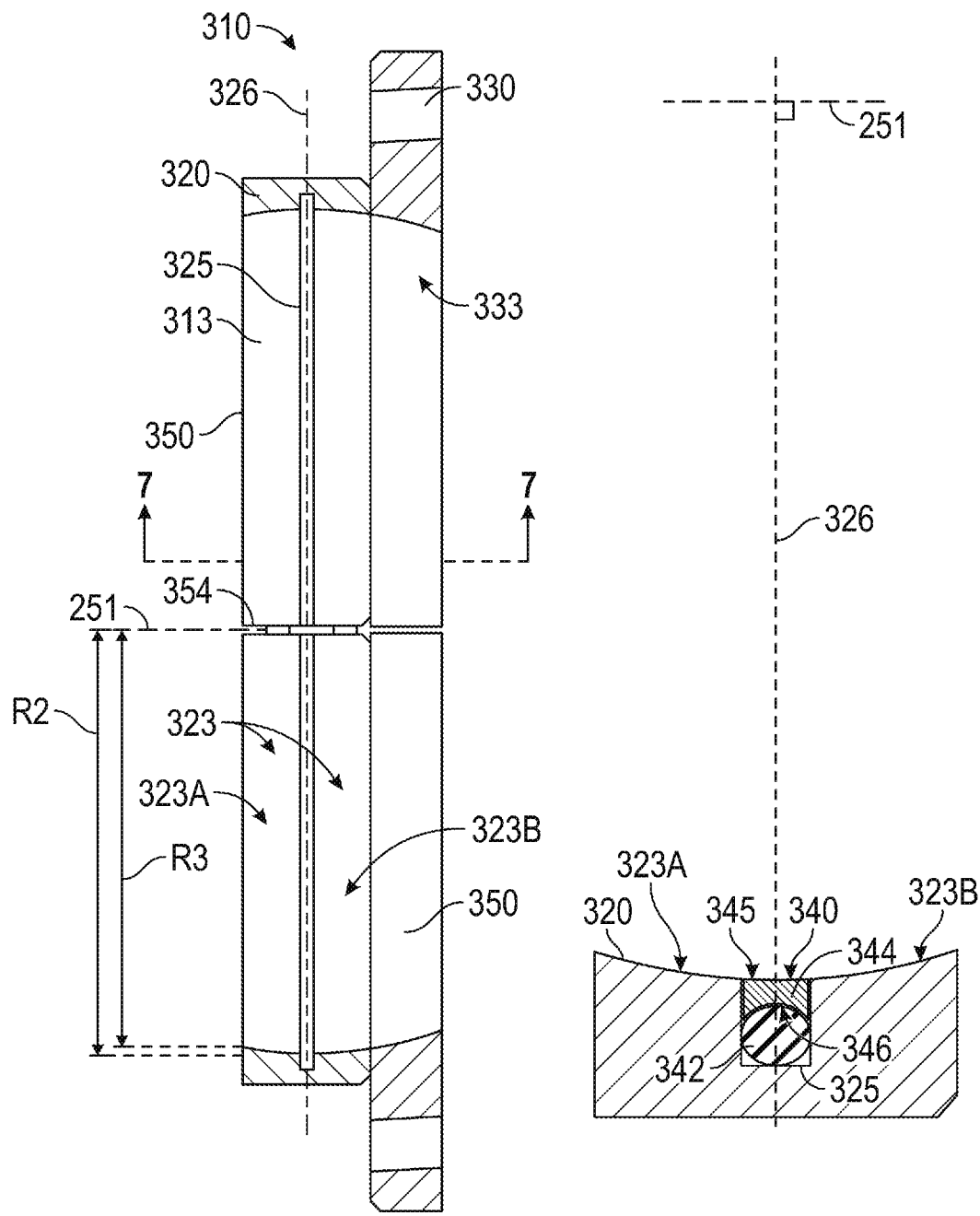
FIG. 6 shows a cross-sectional side view of the retainer of FIG. 5.
FIG. 7 shows the retainer of FIG. 6 taken along a section 7-7 with an embodiment of an annular seal shown in accordance with principles described herein.

Referring to the cross-sectional view of FIG. 6, a geometric plane 326 perpendicular to axis 251 passes through and, in this embodiment, bisects seal-retaining ring 320 and effectively bisects the ring inner surface 323. As shown in this FIG. 6, a first or left region 323A of inner surface 323 lies to the left of plane 326, and a second or right region 323B of inner surface 323 lies to the right of plane 326. Regions 323A, 323B are separated from each other and from plane 326 by groove 325 and, at least in this embodiment, are equal in size, extending equal distances in opposite directions along axis 251. Surface region 323A achieves its greatest distance R2 from axis 251 adjacent plane 326. As surface region 323A extends away from plane 326 to the left, the distance of surface region 323A from axis 251 decreases, reaching a minimum distance R3 at the outer end of ring 320. Likewise, as surface region 323B extends away from plane 326 in the opposite direction, i.e. to the right in FIG. 6, the distance between surface region 323B and axis 251 decreases. Thus, inner surface regions 323A, 323B have opposite slopes, one positive and one negative along the length of central axis 251, and surface regions 323A, 323B face each other. Relative to central axis 251 (that is to say: as measured along axis 251), inner surface 323 of seal-retaining ring 320 includes a surface region 323A with a positive slope, a surface region 323B with a negative slope, and a region of maximum distance from axis 251 located between the surface regions 323A, 323B. This region of maximum distance from axis 251 may be located on a surface region 323A, 323B and is located adjacent or on plane 326 and adjacent or on seal-retaining groove 325. For example, the region of maximum distance from axis 251 for inner surface 323 may include the edge of surface regions 323A that is nearest surface region 323B or may include the edge of surface regions 323A that is nearest surface region 323A, forming part of seal-retaining groove 325. In some embodiments, the region of maximum distance from axis 251 may be at the intersection of surface regions 323A, 323B when surface regions 323A, 323B intersect plane 326 together. Thus, plane 326 may be called a distance-maximizing-plane for spherical, inner surface region 323 of seal-retaining ring 320, which forms at least a part of retainer inner surface 313.

Figure 4:
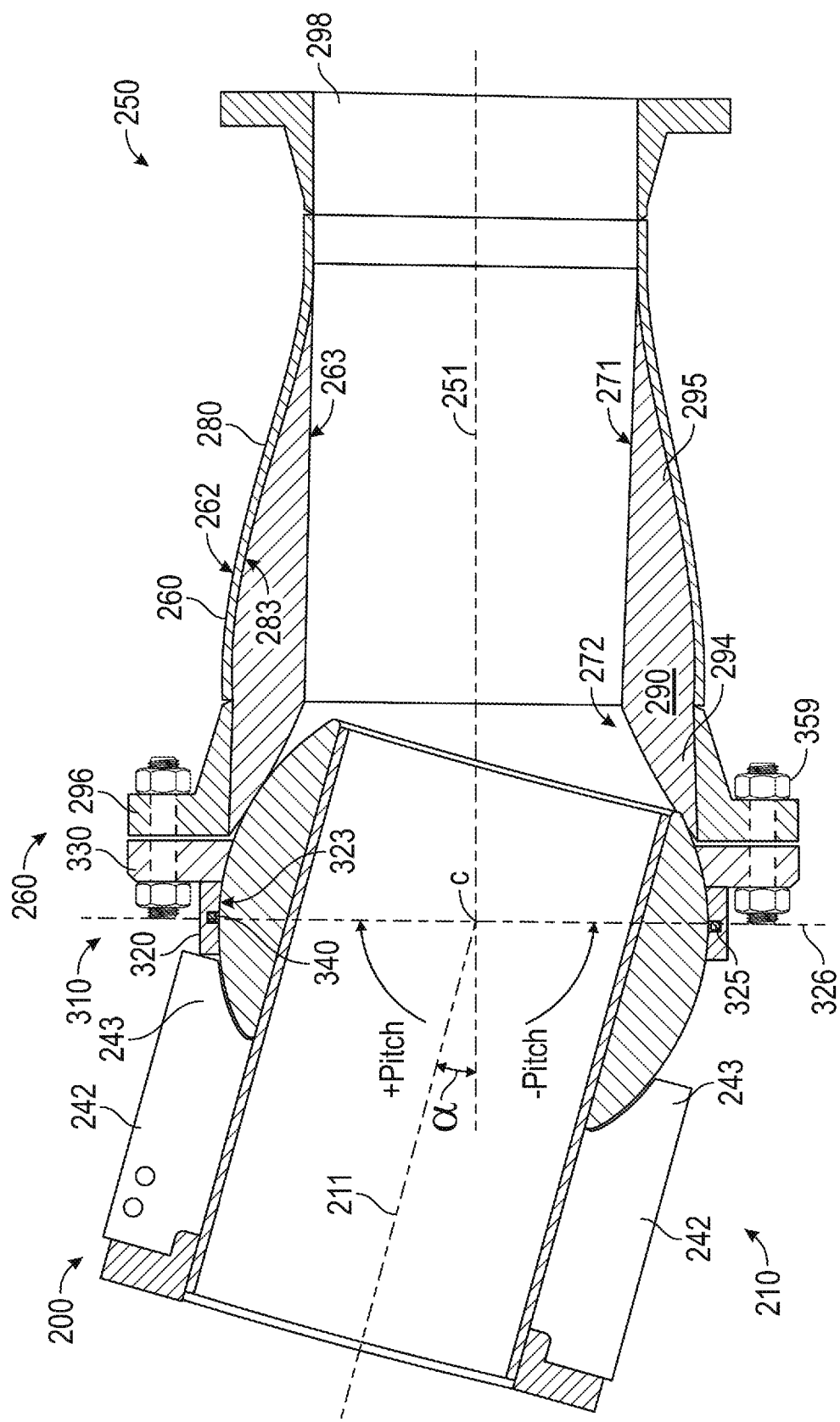
FIG. 4 shows a cross-sectional side view of the articulating joint of FIG. 2 configured with a bend in the flow path.

Referring to FIG. 4, as a result of inner surface 323 having regions of both positive and negative slope around sphere 230, ring 320 grasps partial sphere 230 of first conduit member 210 and is configured to hold or retain sphere 230 as a reaction against forces (or force components) that may act in either direction along axis 251 or as a reaction against forces (or force components) that may act in either direction along axis 211. Without this configuration of ring 320, forces along axis 251 or forces along axis 211 might otherwise act to separate the first conduit member 210 from the second conduit member 260 or might cause these to members to engage too tightly so as to restrict movement. Due to the spherical configuration by which ring 320 surrounds partial sphere 230 and axis 211 circumferentially and by which ring 320 holds sphere 230 in two opposite directions along axis 211 (or axis 251), ring 320 is configured as a single member that grasps and retains sphere 230, and first conduit member 210 is capable of reacting against forces in any of the three orthogonal directions.

Retainer flange 330 and its inner surface 333 have a concave curvature that matches the convex curvature of the surface region 219 and engages partial sphere 230. Retainer flange 330 and flange inner surface 333 fill a volume adjacent partial sphere 230 to reduce fluid flow dead space and may react against forces attempt to push members 210, 260 closer together. Even so, ring 320 is configured and is capable of grasping and retaining sphere 230 alone, even if flange inner surface 333 had an inner diameter large enough such that it did not engage partial sphere 230 in another embodiment.

In its most basic form, ball-in-socket connection 202 is formed by ring 320 and partial sphere 230. Of course, other members such as flanges 296, 320, seal 340, and liner 290 participate as members of connection 202, providing physical support and fluid flow control.

Referring again to FIG. 3, in the assembly of articulating joint 200, geometric plane 326, which is perpendicular to base assembly axis 251, passes through the center C of spherical surface region 219 of conduit member 210, and therefore, plane 326 passes through a great circle of spherical surface region 219. More broadly, depending on the angle of conduit member 210 relative to conduit member 260 of base assembly 250, geometric plane 326 may pass through any of numerous great circles that pass through surface region 219 and its center C. As an example, in the horizontal cross-section of FIG. 3 that includes shorter fins 240, axis 211 of conduit member 210 is perpendicular to plane 326, and, consequently, plane 326 passes through a great circle that exists entirely around a central portion (as view from left-to-right in FIG. 3) of partial sphere 230. As a second example, in the vertical cross-section of FIG. 4 that includes longer fins 242, the angle α between axis 211 (or conduit member 210) and axis 251 (or conduit member 260) is greater than zero. Consequently, axis 211 of conduit member 210 is not perpendicular to plane 326, and, plane 326 passes through a great circle that exists, in part, near end portions of partial sphere 230. Being intersected by plane 326, the ring inner surface 323, seal-retaining groove 325, and seal 340 are configured to surround any of numerous great circles that reside on surface region 219 of the partial sphere 230, depending on the relative angles of conduit member 210, 260 and their axes 211, 215. Thus, the angle α measures or refers the rotation of conduit member 210 with respect to conduit member 260 in a first plane that includes longer fins 242. In the example given, the first plane is vertical and angle alpha indicates or measures pitch. Similarly, an angle β (beta) (which is zero in the embodiment of FIG. 3) refers to the rotation of conduit member 210 with respect to conduit member 260 in a second plane that includes shorter fins 240. In FIG. 3, the second plane is horizontal, and angle β indicates or measures yaw.

As discussed with respect to FIG. 1, some embodiments or systems use two articulating joints joined together, end-to-end. In some of these end-to-end embodiments, the second articulating joint 200 is oriented so that its shorter fins 240 lie in the vertical plane, unlike the shorter fins of the first articulating joint 200 shown in FIG. 2, and its longer fins 242 lie in the horizontal plane, unlike the long fins 242 of the first articulating joint 200 of FIG. 2. For the end-to-end embodiments as just described, positioning the long and short fins of a second articulating joint in different planes than the long and short fins of a first articulating joint may be used to provide flexible movement while controlling the path of that movement. The use of two articulating joints 200 end-to-end may allow the piping system (e.g. mud line 130 of FIG. 1) to more easily reach around an obstruction or a piece of equipment, reducing the potential for interference.

Referring again to FIG. 6, seal-retaining groove 325 is formed through ring inner surface 323 along the plane 326, being bisected by plane 326. As shown in FIG. 4, annular seal 340 in groove 325 is also bisected by plane 326. In the example of FIG. 7, annular seal 340 is formed as two mating members bisected by plane 326. The two mating members of seal 340 include a radially-outer seal member 342, which may be an O-ring, and a radially-inner, contoured seal member 344, which has a smaller diameter than seal member 342. Contoured seal member 344 includes a radially-inner surface 345 contoured as a spherical region to seal against partial sphere 230, along the great circle where plane 326 intersects partial sphere 230. Surface 345 may include other features such as one or more circumferentially extending grooves. Contoured seal member 344 also includes a radially-outer surface 346, which faces and is contoured to seal against the radially-outer seal member 342.

Referring again to FIG. 5, for ease of assembly, retainer 310 of this embodiment is formed by multiple ring segments, each ring segment extending circumferentially around a portion of the circle formed by retainer 310. The exemplary embodiment includes two, half-circle ring segments 350, split along a diameter and joined together by pairs of axially-aligned flanges 352 held by fasteners 358, which include, as examples, pairs of bolt and nuts or pairs of studs and nuts. Each ring segment 350 includes half of retainer flange 330 coupled adjacent half of seal-retaining ring 320 with one of the axially-aligned flanges 352 at each end. Each half of retainer flange 330 coupled to half of seal-retaining ring 320 may be joined, for example, by welding. A gasket or flat seal 354 is installed between each pair of mating flanges 352. Seal 354 surrounds three sides of groove 325 and seal 340, and contacts seal 340 to prevent a fluid in joint 200 from leaking past seal 340 in the plane where segments 350 are interfaced. Seal 340 may also prevent ambient air from leaking into joint 200.

Referring again to FIG. 2, retainer flange 330 couples end-to-end to flange 296 of second conduit member 260 with multiple fasteners 359, which include, as examples, pairs of bolt and nuts or pairs of studs and nuts. As a result, flange 296 may be called a connecting flange. An annular seal or gasket 364 is disposed between connecting flange 296 and retainer flange 330.

Figure 8:
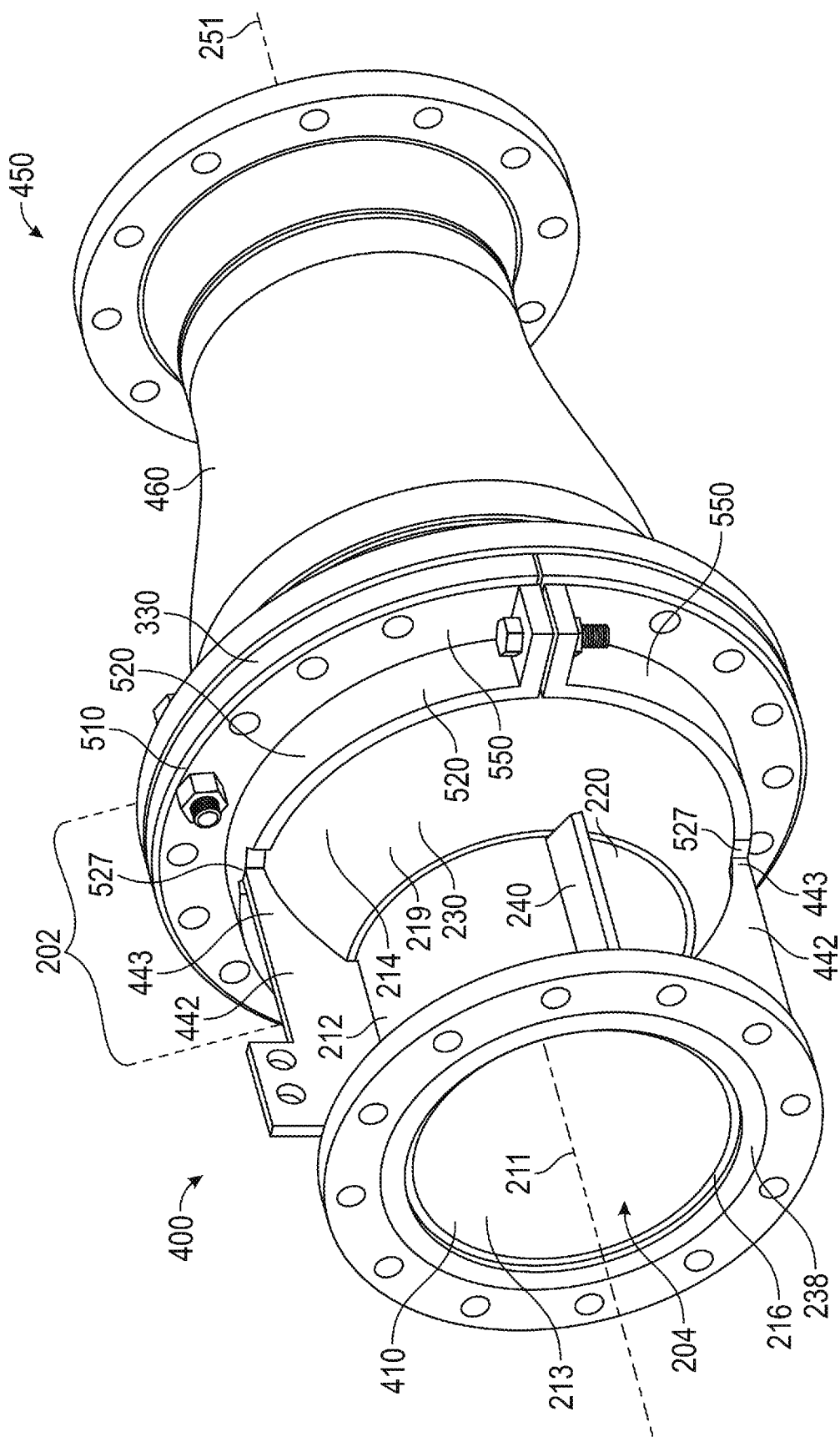
FIG. 8 shows a perspective view of another articulating joint in accordance with principles described herein.
Figure 9:
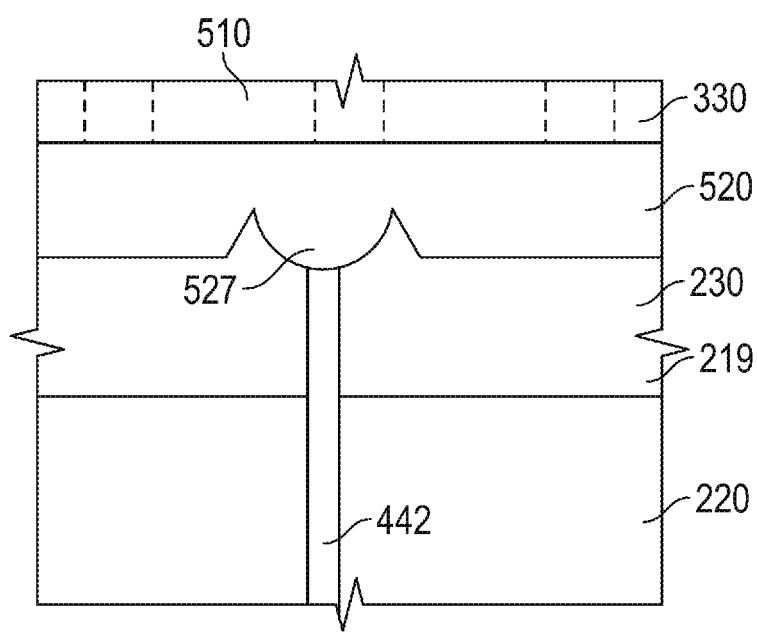
FIG. 9 shows a close view of a portion of the articulating joint of FIG. 8.

Referring now to FIG. 8 and FIG. 9, in another embodiment, a flowline articulating joint 400 includes a ball-in-socket connection 202 and a fluid flow path 204 formed through a first conduit member 410 and a base assembly 450. Base assembly 450 includes a longitudinal axis 251, a second conduit member 260, as described previously including liner 290 (FIG. 3), and includes a retainer 510 coupled at an end of member 260 and centered on axis 251. Second conduit member 260 is pivotably coupled to the first conduit member 410 by ball-in-socket connection 202. Articulating joint 400 is configured to articulate by the swiveling and pivoting capability of ball-in-socket connection 202 and may also be called a swivel joint. Articulating joint 400 is compatible with the system 100 of FIG. 1. Articulating joint 400 may be joined end-to-end with other joints 400 or joints 200, or may be used as a single swivel joint.

First conduit member 410 is similar to first conduit member 210 of articulating joint 200 (e.g. FIG. 2 and FIG. 3) and includes, for example, a longitudinal axis 211, an outer surface 212, an inner surface 213, a proximal end 214 forming part of the ball-in-socket connection 202, a distal end 216 axially spaced from proximal end 214. Also like member 210, first conduit member 410 is formed from a tubular section 220 centered on axis 211, an annular member, which is a partial sphere 230, coupled around a portion of the tubular section 220 at proximal end 214, an annular flange 238 located at distal end 216, and multiple axially aligned, shorter fins 240. This embodiment includes two shorter fins 240 circumferentially spaced-apart 180 degrees on the outer surface 212. At proximal end 214, the outer surface 212 includes a convex, spherical surface region 219 formed by partial sphere 230.

Continuing to reference FIG. 8, first conduit member 410 differs from conduit member 210 because conduit member 410 includes multiple axially aligned, longer fins 442 that extend from flange 238 to retainer 510. In FIG. 8, first conduit member 410 includes two longer fins 442 that are circumferentially spaced-apart by 180 degrees on the outer surface 212. The longer fins 242 each have an elongated fin end 443 that is radially taller than an adjacent portion of partial sphere 230 and that contacts retainer 510. The simultaneous contact of the two fin ends 443 with retainer 510 resists or inhibits the pivoting movement of conduit member 410 in a first plane that includes fins 442.

As in articulating joint 200, the shorter fins 240 of articulating joint 400 restrict the pivoting of first conduit member 410 relative to second conduit member 260 in a second plane that includes shorter fins 240. This pivoting of articulating joint 400 in the second plane may range from zero degrees, with axis 211 aligned with axis 251, to 44 degrees at which point a fin 240 engages or presses against retainer 510. Some embodiments allow movement in the second plane to reach more than 44 degrees, but less than 90 degrees. In the arrangement of FIG. 8, the first plane is vertical and the second plane is horizontal. Thus, for this example, the longer fins 442 resists or inhibits any pitch movement of first conduit member 410 relative to second conduit member 260, and yaw movement is allowed but limited by fins 240.

Retainer 510 is similar to retainer 310 as described with respect to FIG. 5, FIG. 6, and FIG. 7. For example, Retainer 510 includes a concave, spherical inner surface 313, a seal-retaining ring 320 having a seal-retaining groove 325 formed within inner surface 313, a retainer flange 330 coupled adjacent seal-retaining ring 320, and an annular seal 340 disposed within the seal-retaining groove 325. Retainer 510 is similarly formed as two coupled ring segments 550, similar to ring segments 350. In the assembly of joint 400, inner surface 313 covers a portion of surface region 219. Concave inner surface 313 includes two spherical regions: a ring inner surface 323 of seal-retaining ring 320 and a flange inner surface 333 of retainer flange 330. Though not shown in FIG. 8, in retainer 510, as for retainer 310—best seen in FIG. 6—a geometric plane 326 perpendicular to axis 251 passes through and bisects seal-retaining ring 320 and effectively bisects the ring inner surface 323.

Referring again to FIG. 8 and FIG. 9, retainer 510 differs from retainer 310 by the inclusion of multiple convex, curved bosses 527 formed by notches that extend into the end surface of retaining ring 520, Each curved boss 527 faces towards and engages one of the two long fins 442 of first conduit member 410. The surface of bosses 527 may form a circular portion, having a constant radius of curvature. Thus, fins 442 engage retainer 510 along the surface of bosses 527 on ring 520. The fin ends 443 include concave curvature to match and to engage slidingly the curvature of bosses 527, which facilitates pivoting of articulating joint 400 in the second plane (e.g. yaw movement) while at the same time restricting or inhibiting pivoting in the first plane (e.g. pitch movement).

Additional Information

Examples of various embodiments have been presented. Other possible variations or additional embodiments are described next. Additional embodiments may share compatible characteristics of one or more of the previously-described embodiments or those described below.

Referring again to FIG. 4 and FIG. 6, although plane 326 was described as bisecting seal-retaining groove 325 and the seal 340 within groove 325, in some embodiments, inner surface portions 323A, 323B join together at plane 326, and a groove 325 is formed elsewhere in a surface region 323A, 323B, 333. Another groove 325 having another seal 340 may also be formed in a surface region 323A, 323B, 333 or in multiple surface regions.

While exemplary embodiments have been shown and described, modifications thereof can be made by one of ordinary skill in the art without departing from the scope or teachings herein. The embodiments described herein are exemplary only and are not limiting. Many variations, combinations, and modifications of these embodiments or their various features are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. An articulating joint for conveying fluid flow, comprising:

a first conduit member having an inner surface and an outer surface;
a second conduit member having an inner surface and outer surface and being in fluid communication with the first conduit member, the first and second conduit members forming a fluid flow path therethrough;
an annular member disposed about the outer surface of the first conduit member and having an outer surface forming a convex partial sphere;
a retainer disposed about the first conduit member having a seal-retaining ring coupled to the second conduit member;
an annular seal disposed between the seal-retaining ring and the partial sphere and configured to retain fluid in the flow path; and
a liner disposed within the second conduit member and having a central portion forming a part of the flow path, the liner having an end portion adjacent to the first conduit member, the end portion having an end surface region that is convex when viewed in cross section.

2. The articulating joint of claim 1 further comprising:
a connecting flange disposed on the second conduit member at a position adjacent to the first conduit member;
wherein the seal-retaining ring is coupled to a retainer flange;
wherein a plurality of fasteners couples the retainer flange to the connecting flange; and
wherein a seal is disposed between the retainer flange and the connecting flange.

3. The articulating joint of claim 2 wherein the retainer includes an inner surface that faces toward the first conduit member, and wherein at least a region of the inner surface of the retainer comprises concave spherical curvature corresponding to the convex partial sphere of the annular member.

4. The articulating joint of claim 3 wherein the region of the inner surface having concave spherical curvature is positioned adjacent to the second conduit member.

5. The articulating joint of claim 3 wherein the region of the inner surface having concave spherical curvature includes at least a region of the inner surface of the seal-retaining ring.

6. The articulating joint of claim 3 wherein the region of the inner surface having concave spherical curvature includes at least a region of the inner surface of the retainer flange.

7. The articulating joint of claim 3 wherein the retaining ring comprises a plurality of circumferentially extending, partial ring segments coupled together by a plurality of fasteners.

8. The articulating joint of claim 1 wherein the seal-retaining ring has an inner surface that has a surface finish that is within the range of 16 to 32 RMS.

9. The articulating joint of claim 1 wherein the inner surface of the second conduit portion includes an increased diameter region adjacent to the first conduit member, and wherein the increased diameter region includes a surface that faces the partial sphere and is non-planar when viewed in cross section.

10. The articulating joint of claim 9 wherein the non-planar surface is convex when viewed in cross section.

11. An articulating joint for conveying fluid flow, comprising:
a first conduit member having an inner surface and an outer surface;
a second conduit member having an inner surface and outer surface and being in fluid communication with the first conduit member, the first and second conduit members forming a fluid flow path therethrough;
an annular member disclosed about the outer surface of the first conduit member and having an outer surface forming a convex partial sphere;
a retainer disposed about the first conduit member having a seal-retaining ring coupled to the second conduit memeber;
an annular seal disposed between the seal-retaining ring and the partial sphere and configured to retain fluid in the flow path; and
a fin extending in an axial direction along the outer surface of the first conduit member, and having a portion configured to engage the retainer upon the angle between the first and second conduit members being between 0 and 44 degrees.

12. An articulating joint for conveying fluid flow, comprising:
a first conduit member having an outer surface comprising a partial sphere;
a second conduit member pivotably coupled to the first conduit member;
a fluid flow path through the first and second conduit members;
an annular liner disposed within the second conduit member, the liner comprising a passageway therethrough that forms a region of the fluid flow path, wherein the cross sectional area of the passageway varies, and wherein the liner includes a surface that is convex when viewed in cross section and is positioned adjacent the first conduit member;
an annular seal-retaining member disposed about the partial sphere and comprising an inner surface, wherein at least a region of the inner surface faces the partial sphere and comprises spherical curvature; and
an annular seal disposed between the seal-retaining member and the partial sphere, the seal being configured to retain fluid in the flow path;
wherein the first and second conduit members are configured such that the partial sphere is permitted to move relative to the seal-retaining member and the second conduit member.

13. The articulating joint of claim 12 wherein the seal-retaining member is fixed relative to the second conduit member such that relative movement between the second conduit member and the seal-retaining member is prevented.

14. A drilling mud return line comprising a first articulating joint comprising:
a first conduit member having an inner surface and an outer surface, wherein the outer surface includes a convex region;
a second conduit member having a longitudinal axis, an inner surface, and an outer surface, the second conduit member being in fluid communication with the first conduit member;
wherein the inner surface of the second conduit member includes a convex end region engaging the convex region of the first conduit member; and
wherein a retainer is disposed the convex end region and fixed relative to the second conduit member, forming a base assembly;
a fluid flow path extending through the first and second conduit members;
an annular retainer disposed about the first conduit member and coupled to the second conduit member, wherein the retainer has an inner surface that includes:

a first annular region having a positive slope as measured along to the longitudinal axis;

a second annular region having a negative slope as measured along the longitudinal axis; and a seal-retaining groove extending between the first and second annular regions; and an annular seal disposed within the seal-retaining groove and disposed radially between the retainer and the convex region and configured to retain fluid in the flow path;

wherein the retainer configures the first conduit member to pivot with respect to the second conduit member.

15. The drilling mud return line of claim 14 wherein the first and second annular regions of the retainer comprise concave curvature facing toward and matching the curvature of the convex region.

16. The drilling mud return line of claim 15 wherein the convex region forms a partial sphere;

wherein the concave curvature of the retainer inner surface comprises spherical curvature and is concentric with the partial sphere; and wherein the concave spherical curvature of the retainer inner surface is formed by the first and second annular regions and achieves a maximum distance from the axis at a location between the first and second annular regions and along the seal-retaining groove.

17. The drilling mud return line of claim 14 wherein the first articulating joint further includes a first and a second fin extending axially along the outer surface of the first conduit member, each fin having a fin end;

wherein the first fin is circumferentially spaced from the second fin and comprises a first portion adjacent the convex region, the first portion configured to engage the base assembly to limit the pivoting of the first conduit member to an angle alpha with respect to the second conduit member within a first plane; and wherein the second fin comprises a second portion adjacent the convex region, the second portion configured to engage the base assembly to limit the pivoting of the first conduit member to an angle beta with respect to the second conduit member within a second plane that is disposed at angle from the from the first plane.

18. The drilling mud return line of claim 17 further comprising a second articulating joint connected end-to-end to the first articulating joint.

19. An articulating joint for conveying fluid flow, comprising:

a first conduit member having an outer surface comprising a partial sphere;

a second conduit member pivotably coupled to the first conduit member;

a fluid flow path through the first and second conduit members;

an annular seal-retaining member disposed about the partial sphere and comprising an inner surface, wherein at least a region of the inner surface faces the partial sphere and comprises spherical curvature; and an annular seal disposed between the seal-retaining member and the partial sphere, the seal being configured to retain fluid in the flow path;

wherein the first and second conduit members are configured such that the partial sphere is permitted to move relative to the seal-retaining member and the second conduit member;

wherein the region of the inner surface of the seal-retaining member that faces of the partial sphere includes first and second annular regions disposed axially on opposite sides of a great circle of the partial sphere; and wherein the annular seal is disposed around the great circle and axially between the first and second annular regions of the inner surface of the seal-retaining member.

* * * * *